United States Patent
Siddiqui et al.

(10) Patent No.: US 10,868,812 B2
(45) Date of Patent: Dec. 15, 2020

(54) METHOD AND SYSTEM FOR DEVICE AUTHENTICATION

(71) Applicant: ANI Technologies Private Limited, Karnataka (IN)

(72) Inventors: Shadab Siddiqui, Uttar Pradesh (IN); Jebu Ittiachen, Karnataka (IN)

(73) Assignee: ANI Technologies Private Limited, Bengaluru (IN)

( * ) Notice: Subject to any disclaimer, the term of this patent is extended or adjusted under 35 U.S.C. 154(b) by 362 days.

(21) Appl. No.: 15/925,018

(22) Filed: Mar. 19, 2018

(65) Prior Publication Data

US 2019/0207936 A1 Jul. 4, 2019

(30) Foreign Application Priority Data

Dec. 29, 2017 (IN) .............................. 201741047369

(51) Int. Cl.
*H04L 29/06* (2006.01)
*H04L 9/32* (2006.01)
*G06F 16/28* (2019.01)
*H04L 9/08* (2006.01)

(52) U.S. Cl.
CPC ........ *H04L 63/0876* (2013.01); *G06F 16/285* (2019.01); *H04L 9/0866* (2013.01); *H04L 9/3271* (2013.01); *H04L 63/0435* (2013.01)

(58) Field of Classification Search
CPC ............. H04L 63/0876; H04L 63/0435; H04L 9/3271
See application file for complete search history.

(56) References Cited

U.S. PATENT DOCUMENTS

| 8,769,651 | B2* | 7/2014 | Grajek | H04L 63/083 726/8 |
| 8,793,778 | B2* | 7/2014 | Marinov | H04L 63/08 726/7 |
| 10,255,419 | B1* | 4/2019 | Kragh | H04L 9/3247 |
| 2011/0151890 | A1 | 6/2011 | Platt et al. | |
| 2012/0201381 | A1 | 8/2012 | Miller et al. | |
| 2014/0173686 | A1* | 6/2014 | Kgil | H04L 63/205 726/1 |
| 2015/0237038 | A1 | 8/2015 | Grajek et al. | |

(Continued)

FOREIGN PATENT DOCUMENTS

| EP | 2810401 A1 | 12/2014 |
| EP | 3108612 A1 | 12/2016 |

*Primary Examiner* — Lynn D Feild
*Assistant Examiner* — Viral S Lakhia
(74) *Attorney, Agent, or Firm* — Chip Law Group (57) ABSTRACT

A system and a method for authenticating a device of a user is provided. A set of parameters of the device or the user is captured from the device. The set of parameters are categorized into first and second categories including first and second parameters, respectively. One of the first and second categories is selected based on a trust score of the device. The first challenge is generated based on the first parameters, when the first category is selected. The second challenge is generated based on the second parameters, when the second category is selected. The first or the second challenge is transmitted to the device, and a response message is received in response to the first or second challenge. The response message is validated to authenticate the device of the user.

20 Claims, 6 Drawing Sheets

(56) References Cited

U.S. PATENT DOCUMENTS

| | | | |
|---|---|---|---|
| 2015/0242605 A1* | 8/2015 | Du | H04W 12/0605 |
| | | | 726/7 |
| 2015/0244706 A1* | 8/2015 | Grajek | H04W 12/06 |
| | | | 726/6 |
| 2015/0278506 A1* | 10/2015 | Jun | H04L 63/08 |
| | | | 726/6 |
| 2017/0063932 A1* | 3/2017 | Hubbard | H04L 63/0861 |
| 2018/0097840 A1* | 4/2018 | Murthy | H04L 63/02 |
| 2018/0123804 A1* | 5/2018 | Smith | H04L 9/30 |
| 2018/0124049 A1* | 5/2018 | Lu | H04L 63/0876 |
| 2018/0176222 A1* | 6/2018 | Bhaskar | H04L 63/0815 |
| 2018/0248863 A1* | 8/2018 | Kao | H04L 63/08 |
| 2019/0057199 A1* | 2/2019 | Hutchinson | H04W 12/06 |
| 2019/0132308 A1* | 5/2019 | Graham | H04L 63/0823 |
| 2019/0188368 A1* | 6/2019 | Hastings | G06F 21/35 |
| 2019/0207975 A1* | 7/2019 | Wardman | H04L 51/046 |
| 2019/0268325 A1* | 8/2019 | Roper | H04L 9/3226 |

\* cited by examiner

METHOD AND SYSTEM FOR DEVICE AUTHENTICATION

CROSS-RELATED APPLICATIONS

This application claims priority of Indian Application Ser. No. 201741047369, filed Dec. 29, 2017, the contents of which are incorporated herein by reference.

FIELD OF THE INVENTION

The present invention relates generally to an authentication system, and more particularly, to a method and a system for authenticating a device of a user based on parameters of the device and the user.

BACKGROUND

Electronic devices, such as smartphones and tablets, are a vital source of information for users. The users utilize their devices for communicating with other users, accessing the information as per their requirements, and utilizing various other services by means third-party applications installed on their devices. The devices may further store personal information of the users. One of the various services utilized by the users is a digital transaction, such as a digital money transaction to buy, sell, or share products or services.

With the introduction of the digital money and increased ease of access to the digital money, the users utilize their devices to perform the digital money transaction. The devices are installed with service applications for conducting digital money transactions. The service applications allow the users to connect to remote servers for conducting the digital money transactions. The service applications transfer the information of the digital money transaction to the remote servers. The remote servers determine and approve the digital money transactions based on the information provided by the users. Generally, transport service providers, such as cab service providers, provide digital wallets to the users to store their digital money, and perform digital money transactions using their digital wallets for the used services. However, it may be possible to breach through credentials of the users, either by installing software such as malware or virus, or by intercepting the information during a transaction process. Individuals, such as hackers, equipped with knowledge and tools, can access the information and replicate the information of the users onto different devices for making the digital money transactions.

The conventional method for solving the above mentioned problems include authenticating the device on which the service application is installed before executing the digital money transactions. One disadvantage of the above method is the requirement for accessing each of device parameters for authentication purposes. Each of the device parameters have to be accessed and transmitted to the remote server for the authentication. This process of authentication consumes a higher amount of power and time for authenticating the device. This results in greater consumption of the power from a battery of the device. Another disadvantage of the above method is that the remote server consumes a higher amount of time and power for authenticating each of the devices requesting the remote server for the authentication. Furthermore, generally, the authentication procedure does not include the detection of the presence of the device with the actual user of the device. This results in other users with access to the device, other than the actual user of the device, to conduct the digital money transactions.

In light of the foregoing, there exists a need for a technical and more reliable solution that solves the above-mentioned problems and manages the authentication of the device. Further, there is a need for a method and system that consumes lesser amount of time and power compared to the existing solutions, for authenticating the device.

SUMMARY

Various embodiments of the present invention provide a method and a system for authenticating a device of a user. The method includes one or more operations that are executed by circuitry of the system. The circuitry captures parameters of at least one of the device or the user from the device over a communication network. The parameters are captured by means of an application installed on the device. The parameters are categorized into first and second categories that include first and second parameters of the parameters, respectively. The first parameters are variable parameters that change with respect to time, and the second parameters are constant parameters that do not change with respect to the time. Further, a trust score of the device is determined based on historical challenge-response data associated with the device. The historical challenge-response data includes historical challenges utilized for challenging the device in the past and historical response messages corresponding to the historical challenges. The circuitry generates a first or second challenge for challenging an authentication of the device. The first or second challenge is generated based on first or second parameters, respectively. In an embodiment, the first challenge is generated, when the first category is selected from the first and second categories for challenging the authentication of the device based on a trust score of the device. The second challenge is generated, when the second category is selected from the first and second categories for challenging the authentication of the device based on the trust score of the device. The circuitry encrypts the first or second challenge by means of a symmetric encryption before transmitting the first or second challenge to the device. After the encryption, the circuitry transmits one of the encrypted first or second challenge to the device based on the selected first or second category, respectively. The circuitry further transmits a symmetric key along with the encrypted first or second challenge to the device.

Further, in an embodiment, the symmetric key may be utilized by the device to decrypt the encrypted first or second challenge. The circuitry receives a response message including first or second features in response to the first or second challenge from the device over the communication network, respectively. The received response is validated based on a comparison of the first or second features with stored first or second features of the first or second parameters, respectively. Based on the validation, the device may be authenticated. In an exemplary embodiment, the device is authenticated, when the first or second features are successfully validated. In another exemplary embodiment, the second challenge is transmitted to the device, when the first features are invalidated. In another exemplary embodiment, the device is unauthenticated, when the second features are invalidated.

Further, in an embodiment, a device fingerprint of the device is generated that is different from device fingerprints of other devices. The device fingerprint may be utilized for storing the historical challenge-response data and the first and second parameters of the device. Further, in an embodiment, the circuitry executes an event on the device by means of the installed application, when the device is unauthenticated. The event is associated with at least one of formatting of the device, a log-out of a user account of the user, an installation of an available update for a parameter of the one or more first parameters, or an uninstallation of a parameter of the one or more first parameters.

Thus, the method and the system of the present invention provide an authentication technique for authenticating the device based on the first or second parameters of the device or the user. The authentication technique of the present invention includes an optional authentication based on the first parameters. If the optional authentication fails, then a mandatory authentication is initiated based on the second parameters. In an event of the failure of the mandatory authentication, an appropriate event, such a log-out of a user account of the user, is executed on the device to ensure safety of digital wallets and other sensitive information of the user stored in a memory of the device. Further, the method and the system of the present invention provide a choice to validate the first and second parameters at various time intervals based on the selected category, thus, all of the parameters of the device or the user are not validated together, thereby reducing the amount of time and power consumed for the validation, and hence the authentication of the device.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice-versa.

Further areas of applicability of the present invention will become apparent from the detailed description provided hereinafter. It will be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" include plural references unless the context clearly dictates otherwise. For example, the term "an article" may include a plurality of articles unless the context clearly dictates otherwise. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for authenticating a user device of a user. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
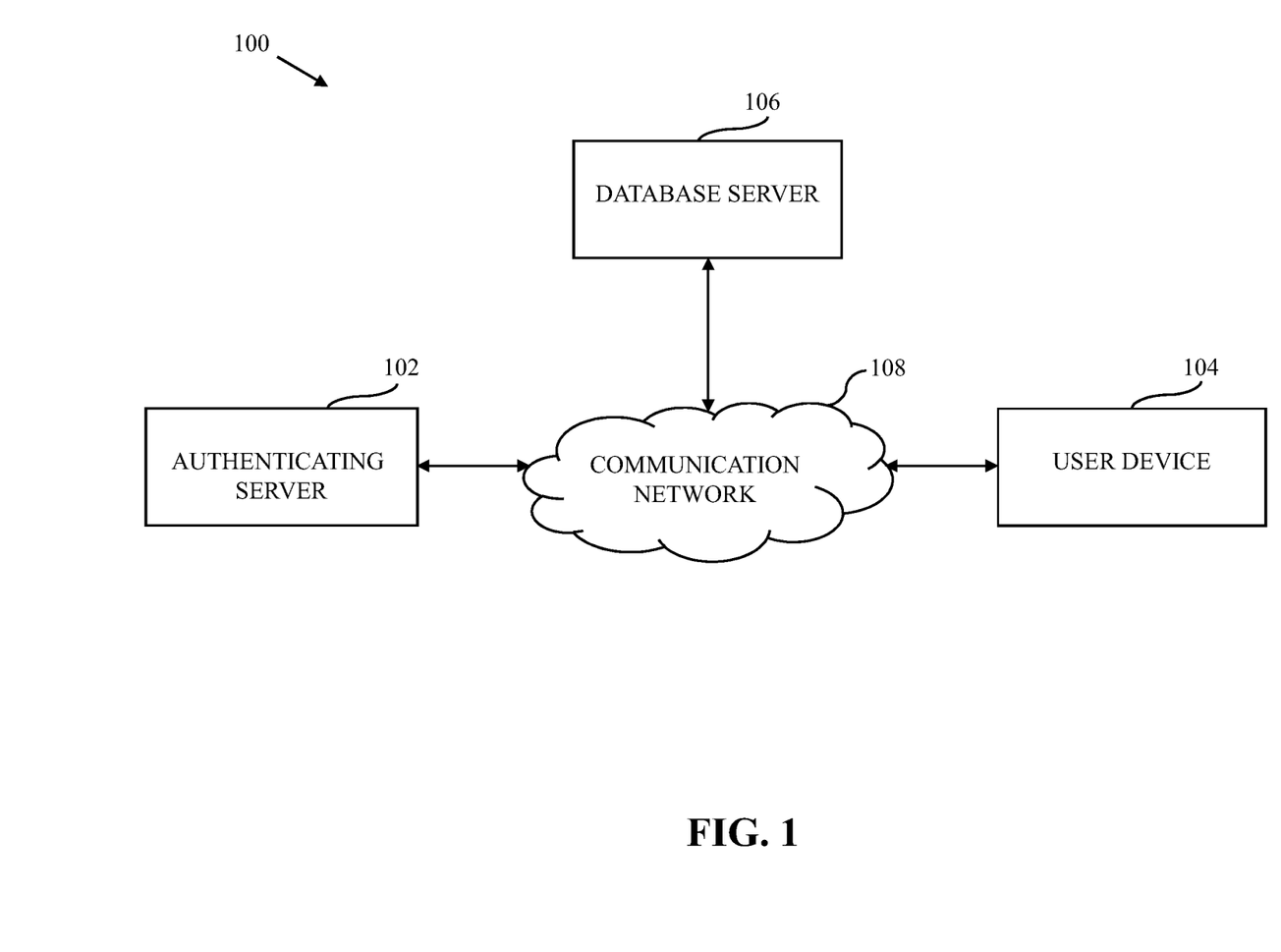
FIG. 1 is a block diagram that illustrates an environment in which various embodiments of the present invention are practiced.

Referring now to FIG. 1, a block diagram that illustrates an environment in which various embodiments of the present invention are practiced. The environment 100 includes an authenticating server 102, a user device 104, and a database server 106 that are connected to each other by way of a communication network 108. Examples of the communication network 108 include, but are not limited to, a wireless fidelity (Wi-Fi) network, a light fidelity (Li-Fi) network, a satellite network, the Internet, a mobile network such as a cellular data network, a high-speed packet access (HSPA) network, a controlled area network (CAN), a local interconnect network (LIN), or any combination thereof.

The authenticating server 102 is a computing device, a software framework, or a combination thereof that may provide a generalized approach to create the authenticating server implementation. In an embodiment, the operation of the authenticating server 102 may be dedicated to execution of procedures, such as, but are not limited to, programs, routines, or scripts stored in one or more memories for supporting its applied applications. In an embodiment, the authenticating server 102 captures a set of parameters from the user device 104 by means of an application installed on the user device 104. The set of parameters are associated with the user device 104 or a user of the user device 104. Examples of the set of parameters associated with the user device 104 include, but are not limited to, an international mobile equipment identity (IMEI) number, a version number of the installed application or an operating software, a product identification (ID) number, a device name, a device model number, a processor type, a size of a random access memory (RAM) or a read-only memory (ROM), a baseband version, a kernel version, a Bluetooth version, and the like. Examples of the set of parameters associated with the user include user behavior patterns, such as a user fingerprint with respect to a finger, a face, an iris, a voice, or the like of the user. The user behavior pattern of the user further includes a user pattern of holding the user device 104, for example, either by a left or right hand of the user, or a speed of typing texts by the user on the user device 104.

Further, the authenticating server 102 categorizes the set of parameters of the user device 104 and the user into first and second categories. In an embodiment, the authenticating server 102 categorizes a parameter of the set of parameters that can change with respect to time as a first parameter corresponding to the first category. For example, the set of parameters, such as the version number of the installed application or an operating software, the user pattern of holding the user device 104, the speed of typing texts by the user, or the like, are categorized as one or more first parameters (hereinafter, first parameters) of the first category. Further, the authenticating server 102 categorizes a parameter of the set of parameters that cannot change with respect to the time as a second parameter corresponding to the second category. For example, the set of parameters, such as the IMEI number, the product ID number, the device name, the device model number, the processor type, the size of the RAM or ROM, the baseband version, the kernel version, the Bluetooth version, the user fingerprint, or the like, are categorized as one or more second parameters (hereinafter, second parameters) of the second category.

The authenticating server 102 generates a first challenge based on the first parameters, when the first category is selected from the first and second categories for authenticating the user device 104. The authenticating server 102 generates a second challenge based on the second parameters, when the second category is selected from the first and second categories for authenticating the user device 104. After generating the first or second challenge, the authenticating server 102 encrypts the first or second challenge by way of symmetric encryption. The authenticating server 102 transmits the encrypted first or second challenge along with a symmetric key to the user device 104 over the communication network 108.

The authenticating server 102 receives a response message from the user device 104 over the communication network 108. The response message includes one or more first or second features (hereinafter, first or second features) corresponding to the first or second challenge. The authenticating server 102 validates the response message by comparing the first or second features with corresponding stored first or second features of the first or second parameters. The authentication server 102 authenticates the user device 104, based on the validation of the response message. For example, the user device 104 is authenticated, when the response message corresponding to the first challenge is successfully validated. In another exemplary embodiment, when the response message corresponding to the first challenge in not successfully validated, the authentication server 102 generates and transmits the second challenge to the user device 104. In another exemplary embodiment, when the response message corresponding to the second challenge in not successfully validated, then the user device 104 is unauthenticated by the authentication server 102.

Further, in an embodiment, the authentication server 102 executes one or more events (hereinafter, events) on the user device 104 by means of the installed application, when the user device 104 is unauthenticated. Examples of the events include, but are not limited to, a formatting of the user device 104, a log-out of a user account of the user associated with the installed application, an installation of an available update for a parameter from the first parameters, or an uninstallation of a parameter from the first parameters. The authenticating server 102 may be realized through various web-based technologies such as, but not limited to, a Java web-framework, a .NET framework, a hypertext preprocessor (PHP) framework, or any other web-application framework. Examples of the authenticating server 102 include, but are not limited to, a personal computer, a laptop, or a network of computer systems. The various operations of the authenticating server 102 have been described in detail in conjunction with FIGS. 2, 3, and 4.

The user device 104 is a computing device that is utilized by the user to perform one or more activities. For example, the user may utilize the user device 104 to initiate a booking request for a ride or make a digital money transaction corresponding to the ride. The user may further utilize the user device 104 to provide responses corresponding to the first or second challenge associated with the first or second parameters of the user. In one embodiment, the user device 104 stores the first or second features corresponding to the first or second parameters of the user device 104. In another embodiment, the user device 104 stores the first or second features corresponding to the first or second parameters of the user. The user device 104 may communicate with the authenticating server 102 by means of the application installed on the user device 104 over the communication network 108. The user device 104 receives the encrypted first or second challenge along with the symmetric key from the authentication server 102. The user device 104 decrypts the encrypted first or second challenge by using the symmetric key, and obtains the first or second features of the first or second challenge, respectively, that are transmitted to the authentication server 102. The user device 104 further executes the events under the control of the authentication server 102. Examples of the user device 104 include, but are not limited to, a mobile phone, a personal computer, a laptop, a tablet computer, and the like.

The database server 106 is a data management and storage server that includes a processor (not shown) and a memory (not shown) for managing and storing the set of parameters of the user device 104 or the user, and the set of features corresponding to the set of parameters. The database server 106 further stores historical challenge-response data associated with the user device 104. The historical challenge-response data includes one or more historical challenges (hereinafter, historical challenges) that had been utilized for challenging the user device 104 in the past and one or more historical response messages (hereinafter, historical response messages) that had been transmitted by the user device 104 corresponding to the historical challenges. The historical challenge-response data may further include an authentication status of the user device 104 corresponding to each of the historical challenges. Examples of the authentication status include "authenticated", "unauthenticated", "authenticated after failing a first category authentication", and the like. In an embodiment, the database server 106 may receive a query from the authentication server 102 to retrieve the stored first or second features corresponding to the first or second parameters, or the historical challenge-response data of the user device 104. In response to the received query, the database server 106 extracts the requested data, and transmits the requested data to the authenticating server 102 over the communication network 108. Examples of the database server 106 include, but are not limited to, a personal computer, a laptop, or a network of computer systems.

Figure 2:
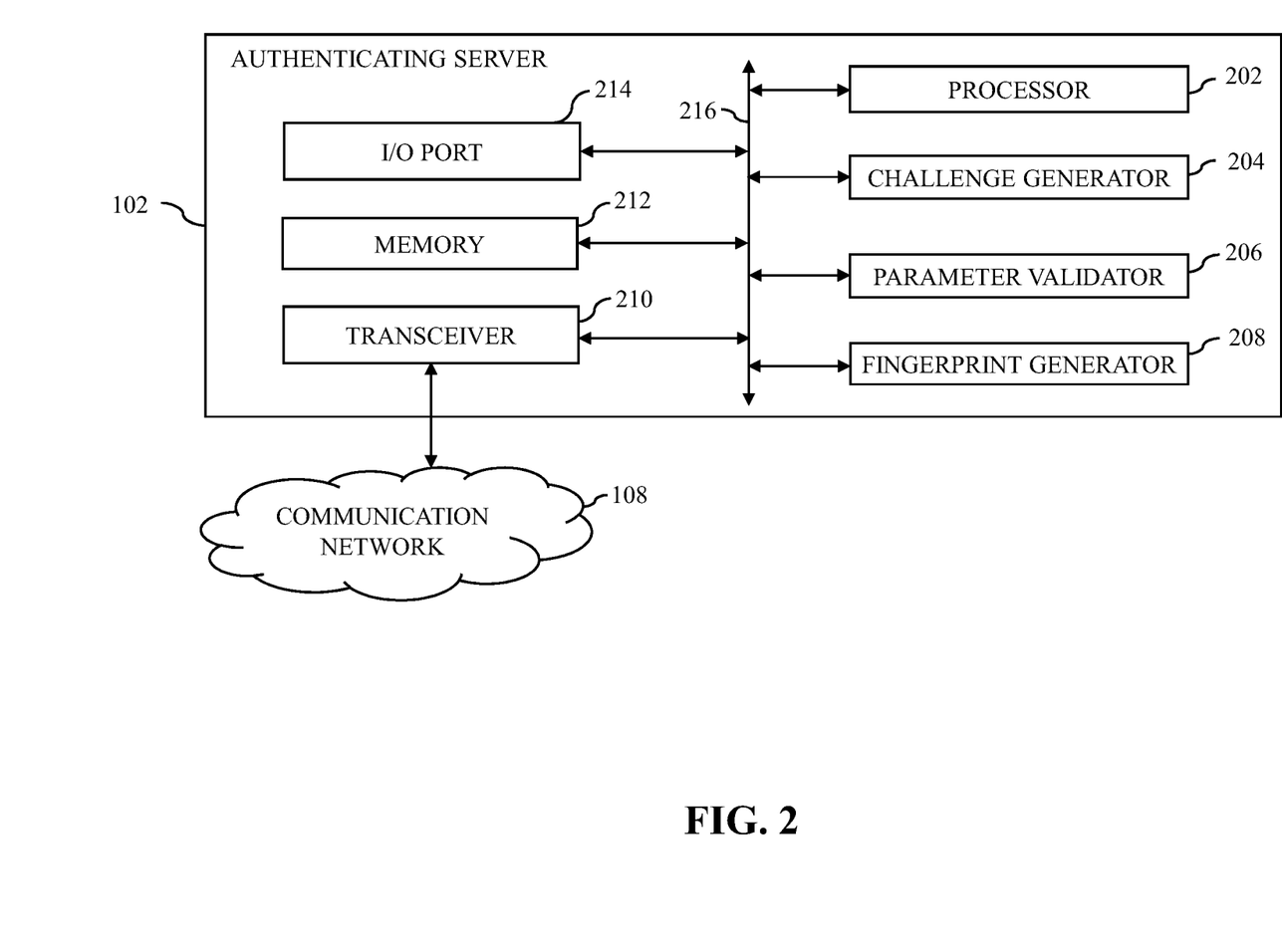
FIG. 2 is a block diagram that illustrates an authenticating server of the environment of FIG. 1, in accordance with an embodiment of the present invention.

Referring now to FIG. 2, a block diagram that illustrates the authenticating server 102 of the environment 100 of FIG. 1 is shown, in accordance with an embodiment of the present invention. The authenticating server 102 includes a processor 202, a challenge generator 204, a parameter validator 206, a fingerprint generator 208, a transceiver 210, a memory 212, and an input-output (I/O) port 214 that communicate with each other by means of a communication bus 216.

The processor 202 includes suitable logic, circuitry, and/or interfaces that are operable to execute one or more instructions stored in the memory 212 to perform one or more operations. In an embodiment, the processor 202 extracts the historical challenge-response data corresponding to the user device 104 from the database server 106. The processor 202 determines a trust score of the user device 104 based on the historical challenge-response data. For example, the processor 202 determines the trust score based on a ratio of a number of successful authentications of the user device 104 in the past to a total number of authentications performed by the processor 202 on the user device 104 in the past. For example, if the user device 104 was tested "5" times for authentication, and out of the "5" times, the user device 104 was successfully authenticated for "3" times, then the trust score of the user device 104 is "0.6" (=3 divided by 5). In another example, the processor 202 determines the trust score based on a ratio of a number of correct historical responses to a total number of historical challenges. For example, if the total number of historical challenges is "10" and the number of correct historical responses is "7", then the trust score of the user device 104 is "0.7" (=7 divided by 10).

The processor 202 selects one of the first and second categories for challenging the authentication of the user device 104 in real-time based on the trust score of the user device 104. For example, when the trust score is greater than or equal to a defined threshold value, the processor 202 selects the first category for challenging the authentication of the user device 104. Similarly, when the trust score is less than the defined threshold value, the processor 202 selects the second category for challenging the authentication of the user device 104. Further, the processor 202 encrypts the first or second challenge generated by the challenge generator 204 using the symmetric key of the symmetric encryption, and transmits the encrypted first or second challenge to the user device 104 by way of the transceiver 210 over the communication network 108.

The processor 202 further determines the authentication status of the user device 104 based on a validation status of the first or second features corresponding to the first or second challenge, and executes the events on the user device 104 based on the authentication status. The processor 202 executes the events on the user device 104 by means of the installed application, when the user device 104 is unauthenticated. Examples of the processor 202 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the processor 202 is compatible with multiple operating systems.

The challenge generator 204 includes suitable logic, circuitry, and/or interfaces that are operable to execute one or more instructions stored in the memory 212 to perform one or more operations, for example, generating the first or second challenge based on the selected category from the first and second categories. For example, when the processor 202 selects the first category for challenging the authentication of the user device 104, the challenge generator 204 generates the first challenge based on one or more of the first parameters of the first category. In another example, when the processor 202 selects the second category for challenging the authentication of the user device 104, the challenge generator 204 generates the second challenge based on one or more of the second parameters of the second category. The challenge generator 204 may be implemented using one or more processing techniques, such as, but are not limited to, an ASIC processor, a RISC processor, a CISC processor, or a FPGA.

The parameter validator 206 includes suitable logic, circuitry, and/or interfaces that are operable to execute one or more instructions stored in the memory 212 to perform one or more operations, for example, validating the first or second features of the first or second challenge that have been received from the user device 104. In one embodiment, the parameter validator 206 validates the first or second features by comparing the first or second features with the stored first or second features of the first or second challenge. In another embodiment, the parameter validator 206 validates the first or second features by comparing a first or second fingerprint corresponding to the first or second features with the stored first or second fingerprints. Based on the validation, the parameter validator 206 determines the validation status (i.e., "successful" or "unsuccessful"), and stores the validation status in the memory 212. The parameter validator 206 may be implemented using one or more processing techniques, such as, but are not limited to, an ASIC processor, a RISC processor, a CISC processor, or a FPGA.

The fingerprint generator 208 includes suitable logic, circuitry, and/or interfaces that are operable to execute one or more instructions stored in the memory 212 to perform one or more operations, for example, generating a device fingerprint of the user device 104. In one example, the device fingerprint may be a unique number that can be assigned to the user device 104 that is different from device fingerprints of other user devices. In another example, the device fingerprint may be generated based on the set of parameters captured from the user device 104. The fingerprint generator 208 further generates the first or second fingerprint based on the first or second features that have been received from the user device 104 corresponding to the first or second challenge. In an embodiment, the fingerprint generator 208 generates the fingerprints using encryption algorithms, such as a hash algorithm. The fingerprint generator 208 may be implemented using one or more processing techniques, such as, but are not limited to, an ASIC processor, a RISC processor, a CISC processor, or a FPGA.

The transceiver 210 includes suitable logic, circuitry, and/or interfaces that are operable to transmit (or receive) data to (or from) various devices, such as the user device 104 or the database server 106 over the communication network 108. For example, the transceiver 210 receives the set of parameters from the user device 104, and stores in the memory 212. The transceiver 210 transmits the encrypted first or second challenge to the user device 104. The transceiver 210 receives the first or second features from the user device 104, and stores in the memory 212. Examples of the transceiver 210 include, but are not limited to, an antenna, a radio frequency transceiver, a wireless transceiver, and a Bluetooth transceiver. The transceiver 210 communicates with the user device 104, the database server 106, and the communication network 108 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The memory 212 includes suitable logic, circuitry, and/or interfaces to store the one or more instructions that are executed by the processor 202, the challenge generator 204, the parameter validator 206, and the fingerprint generator 208 to perform the one or more operations. The memory 212 further stores the set of parameters captured from the user device 104. The memory 212 may further store the first or second challenge, the first or second features, or the fingerprints. Examples of the memory 212 include, but are not limited to, a random-access memory (RAM), a read-only memory (ROM), a programmable ROM (PROM), and an erasable PROM (EPROM).

The I/O port 214 includes suitable logic, circuitry, and/or interfaces that are operable to execute one or more instructions stored in the memory 212 to perform one or more operations. The I/O port 214 may include input and output devices that are configured to operate under the control of the processor 202 by way of the communication bus 216. For example, by means of the I/O port 214, an administrator associated with the authentication server 102 provides inputs to perform the one or more operations, for example, defining the threshold value for selecting one of the first and second categories for challenging the authentication of the user device 104. Examples of the input devices may include a universal serial bus (USB) port, an Ethernet port, a real or virtual keyboard, a mouse, a joystick, a touch screen, a stylus, a microphone, and the like. Examples of the output devices may include a display, a speaker, headphones, a universal serial bus (USB) port, an Ethernet port, and the like.

Figure 3A:
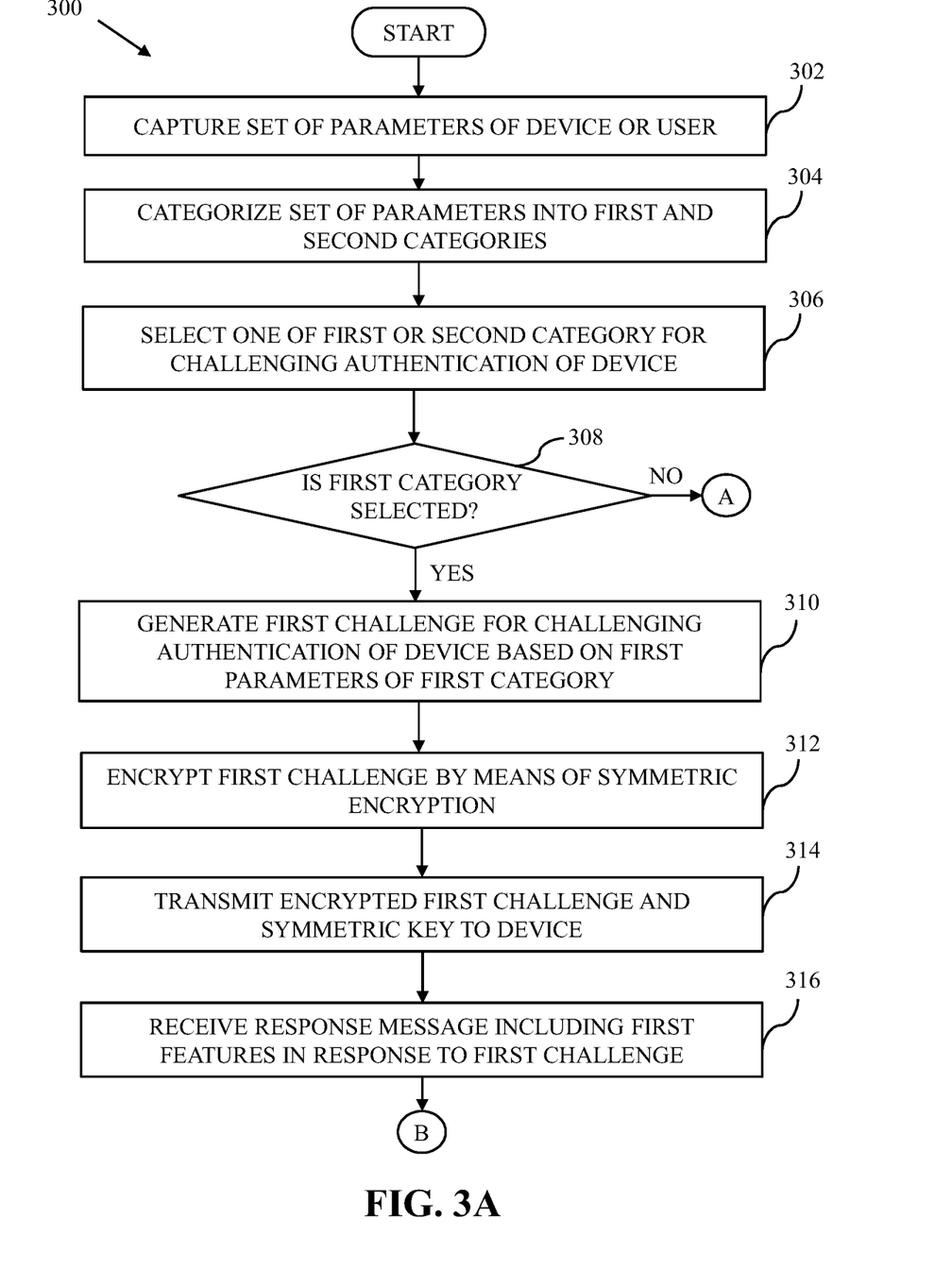
FIGS. 3A-3C, collectively, are flow charts that illustrate a method for authenticating a user device of a user, in accordance with an embodiment of the present invention.
Figure 3B:
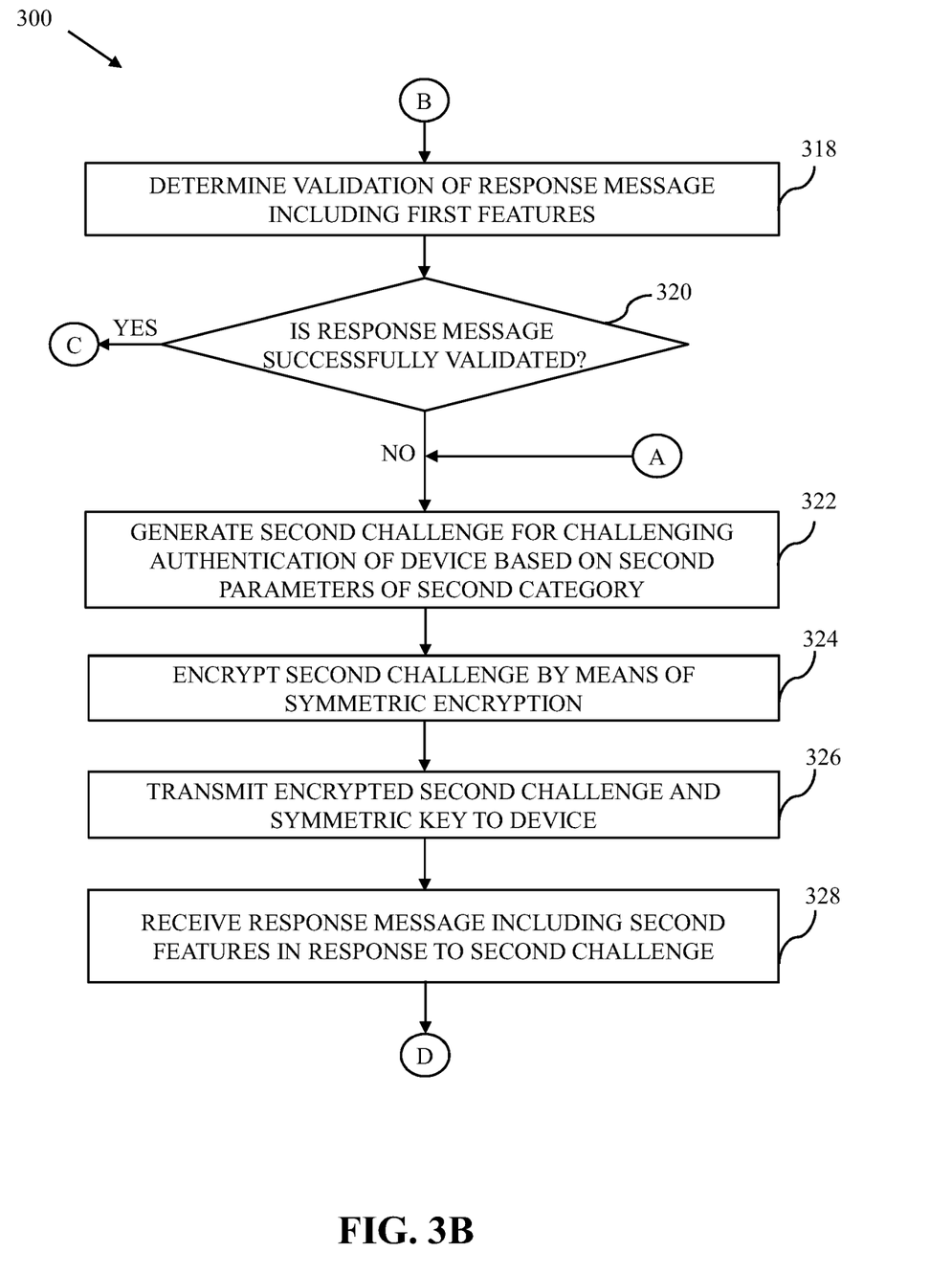
Figure 3C:
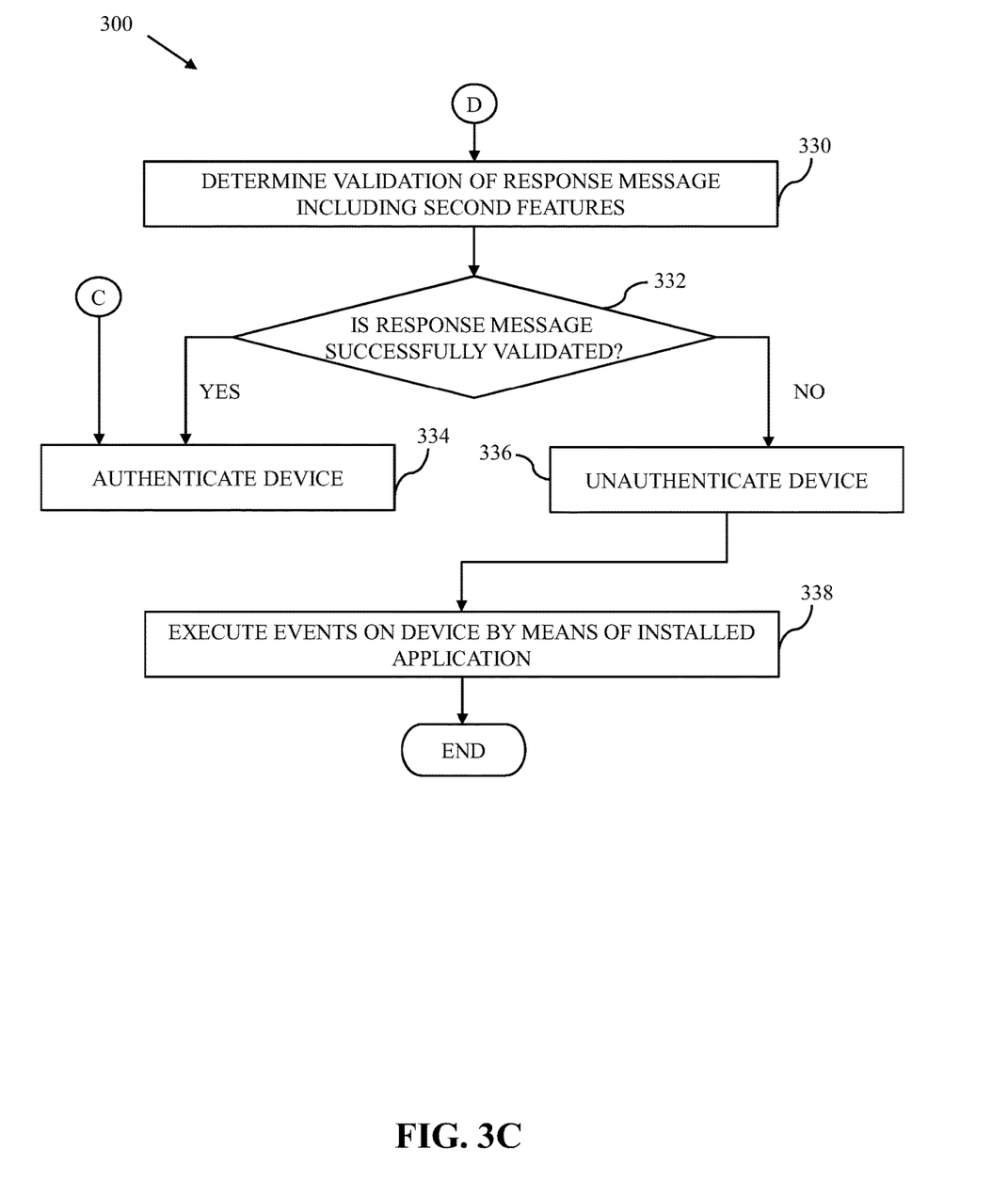

Referring now to FIGS. 3A-3C, a flow chart 300 that illustrates a method for authenticating the user device 104 is shown, in accordance with an embodiment of the present invention.

At step 302, the set of parameters of the user device 104 and the user of the user device 104 are captured. The processor 202 captures the set of parameters by means of the installed application on the user device 104. The processor 202 further captures a set of features corresponding to the set of parameters from the user device 104, and stores in the memory 212. In one embodiment, the processor 202 captures the set of features at the time of installation of the application on the user device 104. In another embodiment, the processor 202 captures the set of features at regular intervals of time from the user device 104.

At step 304, the set of parameters are categorized into the first and second categories. The processor 202 categorizes the parameters of the set of parameters, for example, variable parameters of the set of parameters that may change with respect to the time, as the first parameters of the first category. For example, the parameters, such as the version number of the operating system on the user device 104 or the typing speed of the user, are categorized into the first category. Further, the processor 202 categorizes the parameters of the set of parameters, for example, constant parameters of the set of parameters that may not change with respect to the time, as the second parameters of the second category. For example, the parameters, such as the IMEI number of the user device 104 or the fingerprint of the user, are categorized into the second category.

At step 306, one of the first and second categories is selected for challenging authentication of the user device 104. The processor 202 selects one of the first and second categories based on the trust score of the user device 104. The trust score may be determined based on the historical challenge-response data of the user device 104. In one embodiment, the processor 202 determines the trust score as "0.85", when the user device 104 has successfully responded "85" percent of times corresponding to the historical challenges. After determining the trust score, the processor 202 compares the trust score with the defined threshold value. If the trust score is greater than or equal to the defined threshold value, the processor 202 selects the first category, otherwise, selects the second category from the first and second categories. In another embodiment, the processor 202 selects the first category from the first and second category, when the user device 104 is being challenged for the first time.

At step 308, a check is performed to determine whether the first category has been selected for challenging the authentication of the user device 104. If at step 308, it is determined that the first category has been selected, then control flows to step 310. However, if at step 308, it is determined that the second category has been selected, then control flows to step 322.

At step 310, the first challenge is generated for challenging authentication of the user device 104. The challenge generator 204 generates the first challenge based on the first parameter(s) of the first category.

At step 312, the generated first challenge is encrypted. The processor 202 encrypts the generated first challenge by means of the symmetric key of the symmetric encryption to obtain the encrypted first challenge.

At step 314, the encrypted first challenge and the symmetric key are transmitted to the user device 104. The processor 202 transmits the encrypted first challenge and the symmetric key to the user device 104 by means of the installed application over the communication network 108. The user device 104 receives the encrypted first challenge and the symmetric key, and decrypts the encrypted first challenge by using the symmetric key to obtain the first challenge. The user device 104 obtains the first features, and generates the response message including the first features corresponding to the first challenge. The user device 104 transmits the response message to the transceiver 210 over the communication network 108.

At step 316, the response message including the first features in response to the first challenge is received. The processor 202 receives the response message by way of the transceiver 210 over the communication network 108. The processor 202 transmits the response message to the parameter validator 206 for validating the received response message.

At step 318, the validation of the response message is determined. The parameter validator 206 determines the validation status of the response message by comparing the first features with the stored first features, and stores the validation status in the memory 212.

At step 320, a check is performed to determine whether the response message has been successfully validated. The processor 202 retrieves the validation status from the memory 212, and determines the validation of the response message. If at step 320, it is determined that the response message has been successfully validated, then control flows to step 334. However, if at step 320, it is determined that the response message has not been successfully validated, then control flows to step 322.

At step 322, the second challenge for challenging the authentication of the user device 104 is generated. The challenge generator 204 generates the second challenge based on the second parameter(s) of the second category.

At step 324, the generated second challenge is encrypted. The processor 202 encrypts the generated second challenge by means of the symmetric key of the symmetric encryption to obtain the encrypted second challenge.

At step 326, the encrypted second challenge and the symmetric key are transmitted to the user device 104. The processor 202 transmits the encrypted second challenge and the symmetric key to the user device 104 by means of the installed application over the communication network 108. The user device 104 receives the encrypted second challenge and the symmetric key, and decrypts the encrypted second challenge by using the symmetric key to obtain the second challenge. The user device 104 obtains the second features, and generates the response message including the second features corresponding to the second challenge. The user device 104 transmits the response message to the transceiver 210 over the communication network 108.

At step 328, the response message including the second features in response to the second challenge is received. The processor 202 receives the response message by way of the transceiver 210 over the communication network 108. The processor 202 transmits the response message to the parameter validator 206 for validating the received response message.

At step 330, the validation of the response message is determined. The parameter validator 206 determines the validation status of the response message by comparing the second features with the stored second features, and stores the validation status in the memory 212.

At step 332, a check is performed to determine whether the response message has been successfully validated. The processor 202 retrieves the validation status from the memory 212, and determines the validation of the response message. If at step 332, it is determined that the response message has been successfully validated, then control flows to step 334. However, if at step 332, it is determined that the response message has not been successfully validated, then control flows to step 336.

At step 334, the user device 104 is authenticated. The processor 202 successfully authenticates the user device 104 based on the successful validation of the response message corresponding to one of the first or second challenge.

At step 336, the user device 104 is unauthenticated. The user device 104 is unauthenticated based on the unsuccessful validation of the response message corresponding to the second challenge.

At step 338, the events are executed on the user device 104. The processor 202 executes the events on the user device 104 by means of the installed application, when the user device 104 has been unauthenticated. The events are associated with at least one of the formatting of the user device 104, the log-out of the user account of the user, the installation of the available update for the parameter of the first parameters, or the uninstallation of the parameter of the first parameters.

Figure 4:
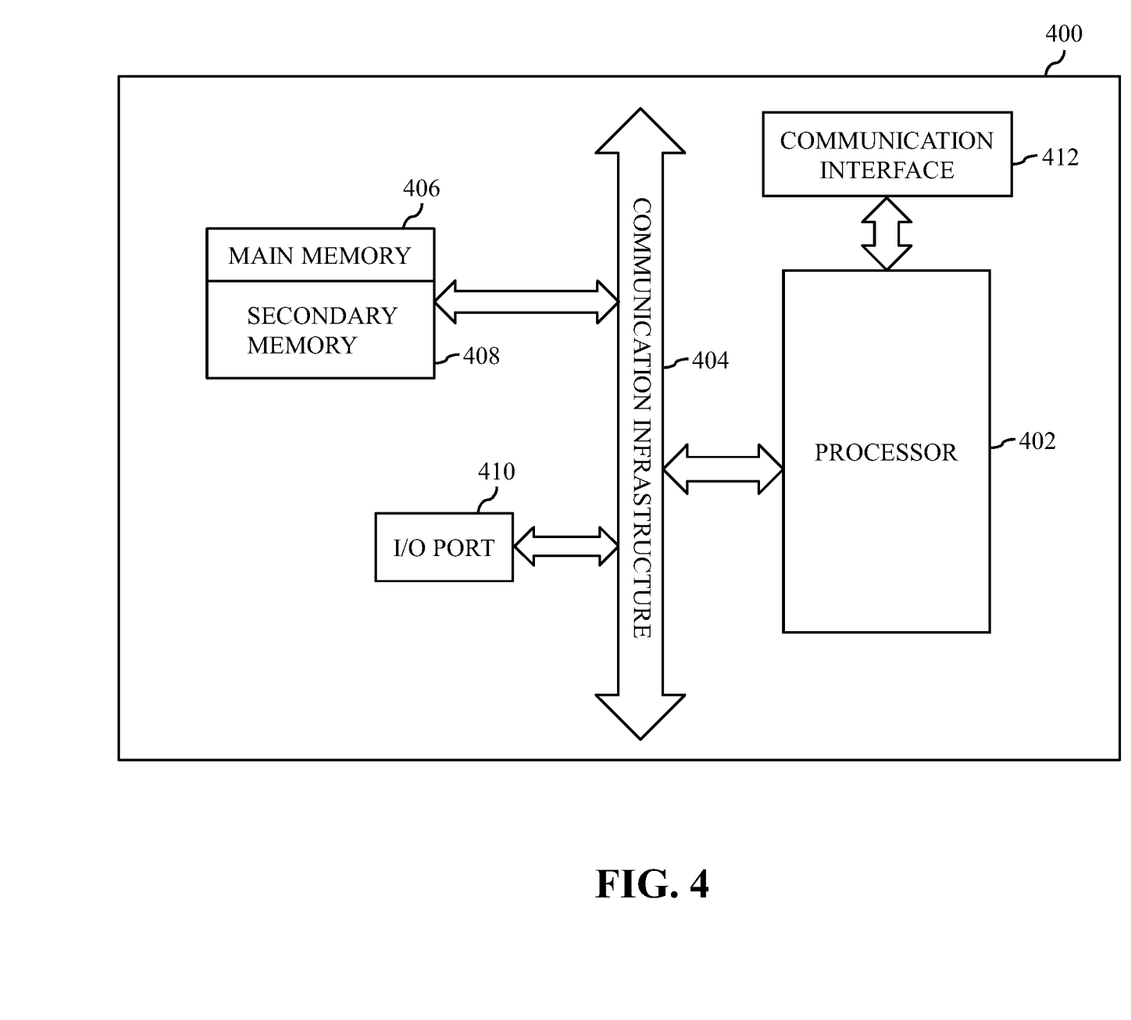
FIG. 4 is a block diagram that illustrates a computer system for authenticating a user device of a user, in accordance with an embodiment of the present invention.

Referring now to FIG. 4, a block diagram that illustrates a computer system 400 for authenticating the user device 104 of the user is shown, in accordance with an embodiment of the present invention. An embodiment of the present invention, or portions thereof, may be implemented as computer readable code on the computer system 400. In one example, the authenticating server 102 and the database server 106 of FIGS. 1 and 2 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A-3C.

The computer system 400 includes a processor 402 that may be a special purpose or a general purpose processing device. The processor 402 may be a single processor, multiple processors, or combinations thereof. The processor 402 may have one or more processor "cores." Further, the processor 402 may be connected to a communication infrastructure 404, such as a bus, a bridge, a message queue, the communication network 108 multi-core message-passing scheme, and the like. The computer system 400 further includes a main memory 406 and a secondary memory 408. Examples of the main memory 406 may include random access memory (RAM), read-only memory (ROM), and the like. The secondary memory 408 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 400 further includes an I/O port 410 and a communication interface 412. The I/O port 410 includes various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communications port, and the like. Data transferred via the communication interface 412 may be signals, such as electronic, electromagnetic, optical, or other signals as will be apparent to a person skilled in the art. The signals may travel via a communications channel, such as the communication network 108 which may be configured to transmit the signals to the various devices that are communicatively coupled to the computer system 400. Examples of the communication channel may include, but are not limited to, cable, fiber optics, a phone line, a cellular phone link, a radio frequency link, a wireless link, and the like.

Computer program medium and computer usable medium may refer to memories, such as the main memory 406 and the secondary memory 408, which may be a semiconductor memory such as dynamic RAMs. These computer program mediums may provide data that enables the computer system 400 to implement the methods illustrated in FIGS. 3A-3C. In an embodiment, the present invention is implemented using a computer implemented application. The computer implemented application may be stored in a computer program product and loaded into the computer system 400 using the removable storage drive or the hard disc drive in the secondary memory 408, the I/O port 410, or the communication interface 412.

Specific advantages of the method and the system provides the authentication of the user device 104. The parameters of the user device 104 are challenged for authenticating the user device 104. Further, all of the various parameters of the user device 104 are not validated at the same time for the authentication, thereby, reducing an amount of time and a power consumed for the authentication of the user device 104. Furthermore, the user device 104 may be authenticated based on the parameters of the user, for example, the user behavior pattern may be validated to detect whether the user device 104 is being used by the same user or not. Therefore, in the event when a different user accesses the user device 104, the authenticating server 102 detects the change in the user behavior pattern, and thereby, either does not authenticate the user device 104 to perform any activities requested by the different user, or transmits the second challenge to the user device 104. Thus, the method and the system of the present invention provide improved security of digital wallets or sensitive information of the user stored on the user device 104.

Techniques consistent with the present invention provide, among other features, systems and methods for device authentication. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it will be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A device authentication method, comprising:
   capturing, by circuitry, from a device via a communication network, a plurality of parameters associated with the device and a user of the device;
   categorizing, by the circuitry, the plurality of parameters into a first category and a second category, wherein the first category comprises one or more first parameters of the plurality of parameters that are changeable with respect to time, and wherein the second category comprises one or more second parameters of the plurality of parameters that are constant with respect to time;
   generating, by the circuitry, a first challenge or a second challenge for challenging an authentication of the device, wherein the first challenge is generated based on the one or more first parameters and the second challenge is generated based on the one or more second parameters, wherein
   the first challenge is generated based on a selection of the first category from the first category and the second category for challenging the authentication of the device, and
   the second challenge is generated based on a selection of the second category from the first category and the second category for challenging the authentication of the device,
   wherein the first category is selected based on a determination that a trust score of the device is greater than a threshold value and the second category is selected based on a determination that the trust score of the device is less than the threshold value, wherein the trust score of the device is determined based on historical challenge-response data that comprises a number of successful authentications of the device performed in past and a total number of authentications of the device performed in the past, and wherein the trust score of the device corresponds to a ratio of the number of successful authentications to the total number of authentications of the device performed in the past;
   transmitting, by the circuitry, to the device via the communication network, one of the first challenge or the second challenge based on the selected first category or the selected second category, respectively;
   receiving, by the circuitry, from the device via the communication network, a response message including one or more first features or one or more second features based on the transmitted first challenge or the transmitted second challenge, respectively; and
   validating, by the circuitry, the received response message based on a comparison of the one or more first features or the one or more second features with one or more stored first features or one or more stored second features of the one or more first parameters or the one or more second parameters, respectively, wherein
   the device is authenticated based on successful validation of the one or more first features or the one or more second features,
   the second challenge is transmitted to the device based on unsuccessful validation of the one or more first features, and
   the device is unauthenticated based on unsuccessful validation of the one or more second features.

2. The method of claim 1, further comprising generating, by the circuitry, a device fingerprint of the device that is different from device fingerprints of other devices, wherein the device fingerprint is generated based on the plurality of parameters, wherein the device fingerprint is utilized for storing the historical challenge-response data and the one or more first parameters and the one or more second parameters associated with the device.

3. The method of claim 1, further comprising encrypting, by the circuitry, the first challenge or the second challenge by using a symmetric encryption before transmitting the first challenge or the second challenge to the device.

4. The method of claim 3, further comprising transmitting, by the circuitry, to the device via the communication network, a symmetric key along with the first challenge or the second challenge, wherein the device decrypts the first challenge or the second challenge by using the symmetric key, wherein the device obtains the one or more first features or the one or more second features after decrypting the first challenge or the second challenge, respectively, and generates the response message.

5. The method of claim 1, further comprising executing, by the circuitry, one or more events on the device by using an installed application on the device based on the determination that the device is unauthenticated, wherein the one or more events are associated with at least one of a formatting of the device or a log-out from a user account of the user on the device.

6. The method of claim 1, wherein
   the plurality of parameters associated with the device includes at least an international mobile equipment identity (IMEI) number, a version number of an installed application or an operating software, a product identification (ID) number, a device name, a device model number, a processor type, a size of a random access memory (RAM) or a read-only memory (ROM), a baseband version, a kernel version, and a Bluetooth version, and the plurality of parameters associated with the user includes at least a user fingerprint with respect to a finger, a face, an iris, or a voice of the user, a user pattern of holding the device by a left hand or a right hand of the user, and a speed of typing texts by the user on the device.

7. The method of claim 6, wherein the one or more first parameters of the first category include the version number of the installed application or the operating software, the user pattern of holding the device by the left hand or the right hand of the user, and the speed of typing texts by the user on the device.

8. The method of claim 6, wherein the one or more second parameters of the second category include the IMEI number, the product ID number, the device name, the device model number, the processor type, the size of the RAM or the ROM, the baseband version, the kernel version, the Bluetooth version, and the user fingerprint with respect to the finger, the face, the iris, or the voice of the user.

9. The method of claim 6, further comprising:
capturing, by the circuitry, from the device via the communication network, a plurality of features corresponding to the plurality of parameters at a time of installing the application on the device; and
storing, by the circuitry, the plurality of features in a memory, wherein the plurality of stored features includes the one or more stored first features and the one or more stored second features of the one or more first parameters and the one or more second parameters, respectively.

10. A device authentication system, comprising:
circuitry configured to:
capture, from a device via a communication network, a plurality of parameters associated with the device and a user of the device;
categorize the plurality of parameters into a first category and a second category, wherein the first category comprises one or more first parameters of the plurality of parameters that are changeable with respect to time, and wherein the second category comprises one or more second parameters of the plurality of parameters that are constant with respect to time;
generate a first challenge or a second challenge to challenge an authentication of the device, wherein the first challenge is generated based on the one or more first parameters and the second challenge is generated based on the one or more second parameters, wherein
the first challenge is generated based on a selection of the first category from the first category and the second category to challenge the authentication of the device, and
the second challenge is generated based on a selection of the second category from the first category and the second category to challenge the authentication of the device,
wherein the first category is selected based on a determination that a trust score of the device is greater than a threshold value and the second category is selected based on a determination that the trust score of the device is less than the threshold value, wherein the trust score of the device is determined based on historical challenge-response data that comprises a number of successful authentications of the device performed in past and a total number of authentications of the device performed in the past, and wherein the trust score of the device corresponds to a ratio of the number of successful authentications to the total number of authentications of the device performed in the past;
transmit, to the device via the communication network, one of the first challenge or the second challenge based on the selected first category or the selected second category, respectively;
receive, from the device via the communication network, a response message that includes one or more first features or one or more second features based on the transmitted first challenge or the transmitted second challenge, respectively; and
validate the received response message based on a comparison of the one or more first features or the one or more second features with one or more stored first features or one or more stored second features of the one or more first parameters or the one or more second parameters, respectively, wherein
the device is authenticated based on successful validation of the one or more first features or the one or more second features,
the second challenge is transmitted to the device based on unsuccessful validation of the one or more first features, and
the device is unauthenticated based on unsuccessful validation of the one or more second features.

11. The system of claim 10, wherein the circuitry is further configured to generate a device fingerprint of the device that is different from device fingerprints of other devices, wherein the device fingerprint is generated based on the plurality of parameters, wherein the device fingerprint is utilized to store the historical challenge response data and the one or more first parameters and the one or more second parameters associated with the device.

12. The system of claim 10, wherein the circuitry is further configured to encrypt the first challenge or the second challenge by use of a symmetric encryption before transmission of the first challenge or the second challenge to the device.

13. The system of claim 12, wherein the circuitry is further configured to transmit, to the device via the communication network, a symmetric key along with the first challenge or the second challenge, wherein the device decrypts the first challenge or the second challenge by use of the symmetric key, wherein the device obtains the one or more first features or the one or more second features after decryption of the first challenge or the second challenge, respectively, and generates the response message.

14. The system of claim 10, wherein the circuitry is further configured to execute one or more events on the device by use of installed application on the device based on the determination that the device is unauthenticated, wherein the one or more events are associated with at least one of a formatting of the device or a log-out from a user account of the user on the device.

15. A device authentication method, comprising:
capturing, by circuitry, from a device via a communication network, a plurality of parameters associated with the device and a user of the device;
categorizing, by the circuitry, the plurality of parameters into a first category and a second category, wherein the first category comprises one or more first parameters of the plurality of parameters that are changeable with respect to time, and wherein the second category comprises one or more second parameters of the plurality of parameters that are constant with respect to time;

determining, by the circuitry, whether the first category is selected from the first category and the second category, wherein the first category is selected based on a determination that a trust score of the device is greater than a threshold value, wherein the trust score of the device is determined based on historical challenge-response data that comprises a number of successful authentications of the device performed in past and a total number of authentications of the device performed in the past, and wherein the trust score of the device corresponds to a ratio of the number of successful authentications to the total number of authentications of the device performed in the past;

generating, by the circuitry, a first challenge for challenging an authentication of the device, wherein the first challenge is generated based on the one or more first parameters;

transmitting, by the circuitry, to the device via the communication network, the first challenge;

receiving, by the circuitry, from the device via the communication network, a first response message including one or more first features based on the transmitted first challenge;

validating, by the circuitry, the received first response message to determine a validation status, wherein the received first response message is validated based on a comparison of the one or more first features with one or more stored first features of the one or more first parameters;

generating, by the circuitry, a second challenge for challenging the authentication of the device based on the validation status that indicates an unsuccessful validation of the first response message, wherein the second challenge is generated based on the one or more second parameters;

transmitting, by the circuitry, to the device via the communication network, the second challenge;

receiving, by the circuitry, from the device via the communication network, a second response message including one or more second features based on the transmitted second challenge;

validating, by the circuitry, the received second response message, wherein the received response message is validated based on a comparison of the one or more second features with one or more stored second features of the one or more second parameters, wherein the device is authenticated based on a successful validation of the one or more second features, or wherein the device is unauthenticated based on an unsuccessful validation of the one or more second features.

16. The method of claim 15, wherein the plurality of parameters associated with the device includes at least an international mobile equipment identity (IMEI) number, a version number of an installed application or an operating software, a product identification (ID) number, a device name, a device model number, a processor type, a size of a random access memory (RAM) or a read-only memory (ROM), a baseband version, a kernel version, and a Bluetooth version, and the plurality of parameters associated with the user includes at least a user fingerprint with respect to a finger, a face, an iris, or a voice of the user, a user pattern of holding the device by a left hand or a right hand of the user, and a speed of typing texts by the user on the device.

17. The method of claim 16, wherein the one or more first parameters of the first category include the version number of the installed application or the operating software, the user pattern of holding the device by the left hand or the right hand of the user, and the speed of typing texts by the user on the device.

18. The method of claim 16, wherein the one or more second parameters of the second category include the IMEI number, the product ID number, the device name, the device model number, the processor type, the size of the RAM or the ROM, the baseband version, the kernel version, the Bluetooth version, and the user fingerprint with respect to the finger, the face, the iris, or the voice of the user.

19. The method of claim 16, further comprising:

capturing, by the circuitry, from the device via the communication network, a plurality of features corresponding to the plurality of parameters at a time of installing the application on the device; and storing, by the circuitry, the plurality of features in a memory, wherein the plurality of stored features includes the one or more stored first features and the one or more stored second features of the one or more first parameters and the one or more second parameters, respectively.

20. The method of claim 15, further comprising executing, by the circuitry, one or more events on the device by using an installed application on the device based on the determination that the device is unauthenticated, wherein the one or more events are associated with at least a log-out from a user account of the user on the device.

* * * * *